(12) United States Patent
Block et al.

(10) Patent No.: US 8,365,583 B2
(45) Date of Patent: Feb. 5, 2013

(54) METHOD AND SYSTEM FOR TESTING AN OVERSPEED PROTECTION SYSTEM OF A POWERPLANT MACHINE

(75) Inventors: Frederick William Block, Campobello, SC (US); Richard Lee Nichols, Simpsonville, SC (US); Bret Stephen Dalton, Greer, SC (US); Jay Lynn Johnson, Simpsonville, SC (US); George Allen Ellis, Woodruff, SC (US)

(73) Assignee: General Electric Company, Schenectady, NY (US)

( * ) Notice: Subject to any disclaimer, the term of this patent is extended or adjusted under 35 U.S.C. 154(b) by 546 days.

(21) Appl. No.: 12/729,686

(22) Filed: Mar. 23, 2010

(65) Prior Publication Data

US 2011/0232259 A1    Sep. 29, 2011

(51) Int. Cl.
*G01M 15/14*    (2006.01)
(52) U.S. Cl. .................................................. 73/112.01
(58) Field of Classification Search ................ 73/112.01, 73/112.02, 112.03
See application file for complete search history.

(56) References Cited

U.S. PATENT DOCUMENTS

| | | | |
|---|---|---|---|
| 7,677,089 B2 * | 3/2010 | Block et al. ................ | 73/112.01 |
| 7,716,971 B2 * | 5/2010 | Block et al. ................ | 73/112.01 |
| 2007/0013365 A1 | 1/2007 | Jones | |
| 2008/0095609 A1 * | 4/2008 | Block et al. ..................... | 415/30 |
| 2008/0101918 A1 * | 5/2008 | Block et al. ..................... | 415/30 |
| 2011/0232258 A1 * | 9/2011 | Block et al. ................. | 60/39.24 |
| 2011/0232297 A1 * | 9/2011 | Block et al. ..................... | 60/779 |
| 2011/0238358 A1 * | 9/2011 | Block et al. ................... | 702/113 |
| 2012/0198811 A1 * | 8/2012 | Johnson et al. ............ | 60/39.182 |

\* cited by examiner

*Primary Examiner* — Eric S McCall
(74) *Attorney, Agent, or Firm* — Ernest G. Cusick; Frank A. Landgraff (57) ABSTRACT

Embodiments of the present invention have the technical effect of automatically testing an overspeed protection system of a powerplant machine comprising a shaft and integrated with a safety control system. An embodiment of the present invention may automatically test the overspeed protection system while the powerplant machine is in the process of shutting down. Another embodiment of the present invention may automatically test the overspeed protection system of the powerplant machine by adjusting the speed of a shaft while operating at full-speed-no-load.

20 Claims, 10 Drawing Sheets

METHOD AND SYSTEM FOR TESTING AN OVERSPEED PROTECTION SYSTEM OF A POWERPLANT MACHINE

This application is related to commonly-assigned U.S. patent application Ser. No. 11/584,095, filed Oct. 20, 2006; and U.S. patent application Ser. No. 11/589,579, filed Oct. 30, 2006.

BACKGROUND OF THE INVENTION

The present invention relates to a protection system of a powerplant machine; and more particularly to an automated overspeed protection system for the powerplant machine.

An overspeed condition occurs after the speed of a shaft on a powerplant machine exceeds a specified range. During the overspeed condition, a powerplant machine typically experiences severe mechanical and thermal stresses that can cause a catastrophic failure.

Generally, the powerplant machine is equipped with protection systems, which attempt to reduce the effects of an overspeed condition. A governor system generally serves as the primary line of protection. Upon detecting an overspeed condition, the governor attempts to decrease the speed of the shaft. There may also be a secondary, or independent line, of protection—an overspeed protection system. Typically, the overspeed protection system incorporates mechanical, electrical, and software components to safeguard the powerplant machine. An overspeed protection system protects the powerplant machine by initiating an emergency shutdown (commonly called a trip) during an overspeed event.

Some powerplant machines are integrated with an independent and dedicated protection system. This may be considered a safety control system, which provides the powerplant machine with an independent layer of protection. The safety control system commonly provides at least one independent controller; which may trip the powerplant machine, as a safety measure, upon detecting, for example, but not limiting of, an overspeed event.

Essentially, the safety control systems do not integrate with the operational control system. The safety control system does not control the operational control system, and vice-versa. Some safety control systems may operate in parallel with the operational control system. Other safety control systems may operate as an additional layer of protection for the operating powerplant machine.

Powerplant operators periodically test the overspeed protection system to determine if the system is functioning properly. Prior to testing the overspeed protection system, the powerplant machine is customarily operating in a full-speed-no-load (FSNL) condition. FSNL is a condition when the powerplant machine is at a normal operating speed and is not exporting energy to a load. An overspeed test typically involves manually raising the speed of a shaft above the normal operating range. For example, but not limiting of, during an overspeed test operators may raise the speed of the shaft to 110% of the normal operating speed; thereafter the overspeed protection system should trip the powerplant machine.

There are a few problems with the current method of overspeed testing. Manually adjusting the shaft speed may introduce high thermal transients. A trip at a speed near or above the normal operating speed can introduce large mechanical, electrical, and thermal stresses on the components of the powerplant machine. These stresses decrease the maintenance interval. Moreover, after a trip, a re-start of the powerplant machine is required, which delays the exporting of energy. In addition, the current overspeed testing methods typically require that the powerplant machine operate at FSNL. This does not generate revenue but consumes fuel and electricity. These problems drive powerplant machine operators to avoid manual speed adjustments, trips, FSNL operation, and overspeed testing.

For the foregoing reasons, there is a need for a method of testing an overspeed protection system that reduces the chance of a trip. The method should be adaptable to a wide variety powerplant machines, including those integrated with others powerplant machines. The method should be applicable to a powerplant machine integrated with a safety control system.

BRIEF DESCRIPTION OF THE INVENTION

In accordance with an embodiment of the present invention, a method of testing an overspeed protection system of a powerplant, the method comprising: providing a powerplant a powerplant machine comprising a shaft and an operational control system, wherein the operational control system is configured for operating the powerplant machine and comprises an overspeed protection system configured for detecting an overspeed event associated with the shaft; providing a safety control system independent of the operational control system, wherein the safety control system is configured for reducing risk associated with operating the powerplant machine; and wherein the safety control system functions as a stand-alone system independent of the operational control system; selecting a methodology for testing the overspeed protection system; wherein the methodology determines whether the powerplant machine is operating in a shutdown mode or an operating mode; determining whether the speed of the shaft exceeds a shutdown value representative of the overspeed event, if the powerplant machine is in the shutdown mode; determining whether the speed of the shaft exceeds an overspeed trip value representative of the overspeed event, if the powerplant machine is in the operating mode; changing the overspeed trip value; and determining whether the overspeed protection system would operate to trip the powerplant machine; wherein the method reduces the possibility of a trip occurring during testing of the overspeed protection system.

In accordance with an alternate embodiment of the present invention, a method of testing an overspeed protection system of a powerplant, the method comprising: providing a powerplant comprising a gas turbine and a steam turbine, and wherein a shaft integrates the gas turbine and the steam turbine forming a steam and gas powertrain (STAG); providing an operational control system, wherein the operational control system is configured for operating the powerplant machine and comprises an overspeed protection system configured for detecting an overspeed event associated with the shaft; providing a safety control system independent of the operational control system, wherein the safety control system is configured for reducing risk associated with operating the powerplant machine; and wherein the safety control system functions as a stand-alone system independent of the operational control system; selecting a methodology for testing the overspeed protection system; wherein the methodology determines whether the STAG is operating in a shutdown mode or an operating mode; determining whether the speed of the shaft exceeds a shutdown value representative of the overspeed event, if the STAG is in the shutdown mode; determining whether the speed of the shaft exceeds an overspeed trip value representative of the overspeed event, if the STAG is in the operating mode; changing the overspeed trip value; and determining whether the overspeed protection system would operate to trip the STAG; wherein the method reduces the possibility of a STAG trip during testing of the overspeed protection system.

DETAILED DESCRIPTION OF THE INVENTION

The present invention has the technical effect of automatically testing an overspeed protection system of a powerplant machine comprising a shaft and integrated with a safety control system. An embodiment of the present invention may automatically test the overspeed protection system while the powerplant machine is in the process of shutting down. Another embodiment of the present invention may automatically test the overspeed protection system of the powerplant machine by adjusting the speed of a shaft while operating at FSNL.

Detailed example embodiments are disclosed herein. However, specific structural and functional details disclosed herein are merely representative for purposes of describing example embodiments. Example embodiments may, however, be embodied in many alternate forms, and should not be construed as limited to only the embodiments set forth herein.

Accordingly, while example embodiments are capable of various modifications and alternative forms, embodiments thereof are illustrated by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any, and all, combinations of one or more of the associated listed items.

The terminology used herein is for describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted might occur out of the order noted in the FIGS. Two successive FIGS., for example, may be executed substantially concurrently or may sometimes be executed in the reverse order, depending upon the functionality/operations involved.

The present invention may be applied to many forms of powerplant machines, which may be considered a machine that transfers energy, in part by rotating a shaft. Some powerplants are configured with multiple powerplant machines, such as, but not limiting of, turbomachines, and others with rotating shafts. The powerplant configurations may include, but are not limited to, a steam turbine and a gas turbine integrated by a single shaft (commonly called a single-shaft STAG); or a multiple turbines integrated via multiple shafts. The shaft integrates multiple powerplant machines, allowing each powerplant machine to contribute to the torque that rotates the shaft. Therefore, embodiments of the present invention may be applied to a single powerplant machine comprising a single shaft; a single powerplant machine comprising multiple shafts; multiple powerplant machines integrated in a STAG configuration; or multiple powerplant machines integrated via multiple shafts.

Embodiments of the present invention may apply to a wide variety of powerplant machines having the form of a rotating machine such as, but not limiting of, radial, axial, centrifugal machines in open and/or closed systems. This may include, but is not limited to, the following: axial turbines, axial compressors, centrifugal compressors, helical screw compressors, radial-inflow turbines, torque converters, pumps, fans, blowers, hydraulic turbines, marine propellers, wind turbines, or any combination thereof.

The powerplant machine may also have the form of a turbomachine configured for producing power and/or consuming power. These turbomachines may include, but are not limited to, combustion turbines and steam turbines. These turbomachines may primarily function to increase pressure of a working fluid. Non-limiting examples of the working fluid including: air, water, gas, physical matter, or any combination, thereof. These turbomachines may consume a wide variety of energy sources, such as, but not limiting of, gas, liquid fuel, air, water, vapor, wind, electricity, thermal, steam, or any combination thereof.

Embodiments of the present invention may be applied to powerplant machines operating in a wide variety of applications including, but not limited of, the following: aerospace, automotive, refrigeration, heating, industrial, power generation, marine, chemical, agricultural, petrochemical, mechanical drives, pumps, fans blowers, compressors, and the like.

Figure 1:
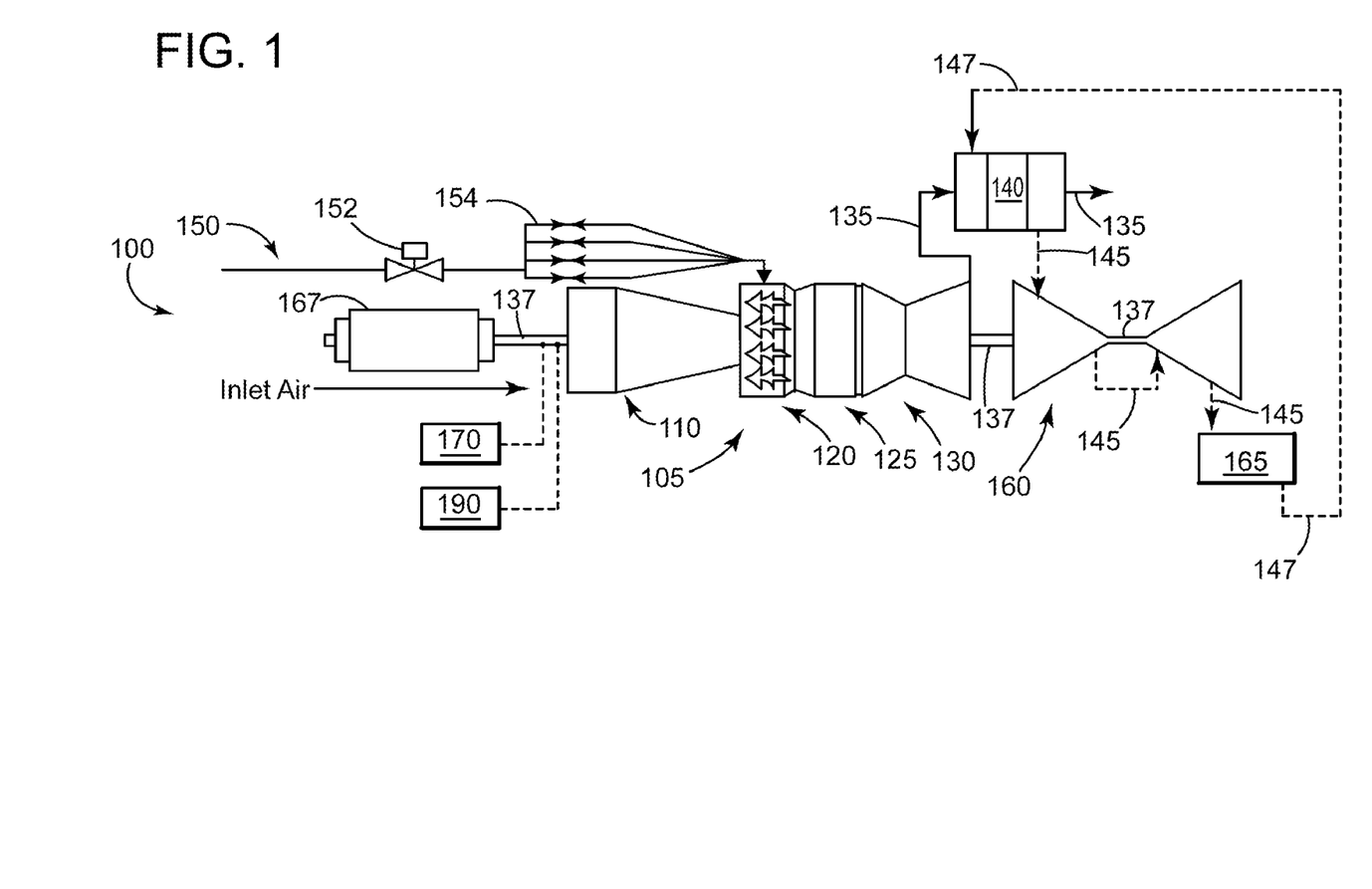
FIG. 1 is a schematic illustrating the environment in which an embodiment of the present invention operates.

Referring now to the FIGS., where the various numbers represent like elements throughout the several views, FIG. 1 is a schematic illustrating an environment in which an embodiment of the present invention may operate. FIG. 1 illustrates a powerplant 100, in a combined cycle configuration, having a gas turbine 105 and a steam turbine 160. A shaft 137 integrates the gas and steam turbines, 105,160. This configuration is considered a single-shaft STAG powertrain. Although, the embodiments of the present invention are described herein with reference to a single-shaft STAG application, the present invention may be applied to other powerplant configurations. Embodiments of the present invention may be applied to a single powerplant machine comprising a single shaft; a single powerplant machine comprising multiple shafts; or multiple powerplant machines integrated via multiple shafts.

The gas turbine 105 generally comprises a compressor section 110, a combustion system 120, a turbine section 125, and an exhaust section 130. Generally, the compressor 110 ingests and compresses an inlet air, represented by an arrow in FIG. 1. The compressed air may flow downstream to the combustion system 120, where the compressed air is mixed with a fuel, such as, but not limiting of, a natural gas, received from the gas fuel system 150, and then combusted. The energy released during the combustion process flows downstream and drives the turbine section 125. A load, such as, but not limiting of, a generator 167 may be coupled to the gas turbine 105 via the shaft 137. Here, the mechanical torque generated in the turbine section 125 drives the generator 167.

The exhaust 135 generated during the operation of the gas turbine 105 may flow downstream through an exhaust section 130 and may be received by a heat recovery steam generator (HRSG) 140. The HRSG 140 utilizes a heat exchanging process to transfer some of the heat in the exhaust 135 to condensate or feedwater 147, creating steam 145. The steam 145 may flow downstream to a steam turbine 160, coupled to gas turbine 105, via the shaft 137. After flowing through the steam turbine 160, the steam 145 may condense in a condensor 165, forming the condensate 147. A condensate or feedwater pump (not illustrated) may then drive the condensate or feedwater 147 into the HRSG 140, where the aforementioned process may be repeated. After flowing through the HRSG 140, the exhaust 135 may flow to the stack (not illustrated). As the steam 145 flows through the steam turbine 160, the energy of the steam 145 is transferred into mechanical torque that drives the shaft 137.

An operational control system 170 may monitor and control the operation of the powerplant 100. In accordance with embodiments of the present invention, the operational control system 170 may implement the overspeed testing system as described below.

A safety control system 190 serves as an independent and dedicated protection system. As discussed, the safety control system provides an independent layer of protection. Some safety control systems may operate in parallel with the operational control system. Some other safety control systems may operate as an additional layer of protection for the operating powerplant machine.

As will be appreciated, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system". Furthermore, the present invention may take the form of a computer program product on a computer-usable storage medium having computer-usable program code embodied in the medium. As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program. Any suitable computer readable medium may be utilized.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory. These instructions can direct a computer or other programmable data processing apparatus to function in a particular manner. This is such that the instructions stored in the computer-readable memory produce an article of manufacture including instruction means which implement the function/act specified in the flowchart and/or block diagram block or blocks. The computer program instructions may also be loaded onto a computer or other programmable data processing apparatus. These instructions may cause a series of operational steps to be performed on the computer or other programmable apparatus to produce a computer implemented process. Here, the instructions, which execute on the computer or other programmable apparatus, provide steps for implementing the functions/acts specified in the flowchart and/or block diagram blocks.

Figure 2:
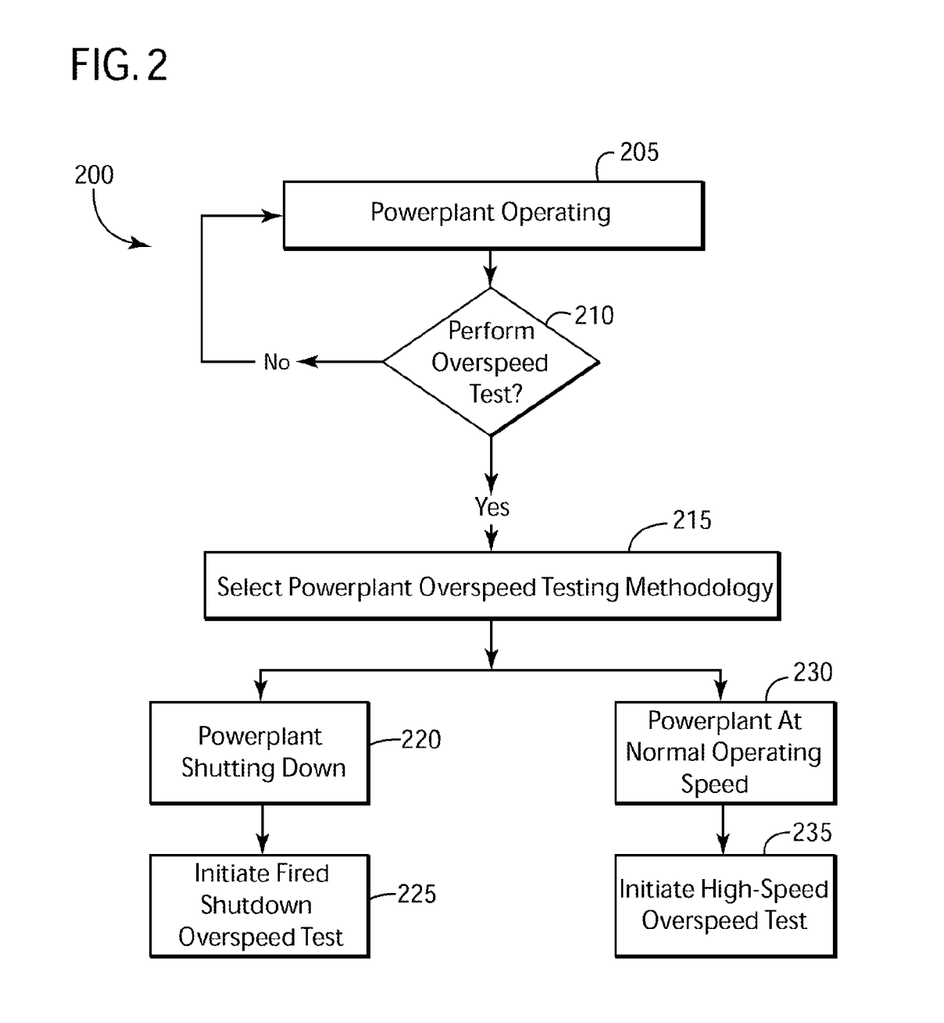
FIG. 2 is a schematic illustrating a method of testing an overspeed protection system in accordance with an embodiment of the present invention.

Referring again to the FIGS., FIG. 2 is a schematic illustrating a method 200 of testing an overspeed protection system in accordance with an embodiment of the present invention. In an embodiment of the present invention, an operator may use the operational control system 170 to monitor and/or control the operation of the method 200, via a graphical user interface (GUI) or the like.

In step 205, the powerplant 100 is in an operational mode. Here, the powerplant 100 may be at FSNL, exporting power, or in a similar operational mode.

In step 210, the method 200 may determine whether a test of the overspeed protection system is desired. Here, an operator may use the GUI to indicate that a test of the overspeed protection system is desired. If a test of the overspeed protection system is desired then the method 200 may proceed to step 215; otherwise the method 200 may revert to step 205.

In step 215, the method 200 may select a powerplant overspeed testing methodology. A significant benefit of the present invention is the ability to test the overspeed protection system via two methodologies. The shutdown methodology allows a user to test the overspeed protection system while the powerplant machines are in the process of shutting down. The operating methodology allows a user to test the overspeed protection system while the powerplant is operating at FSNL. The features and advantages of each methodology are discussed below. If the powerplant is shutting down, then the method 200 may proceed to step 220. If the speed of the shaft of the powerplant is around a normal operating speed, then the method 200 may proceed to step 230.

In step 220, the method 200 may determine that the powerplant may be about to commence and initiate a shutdown process.

In step 225, the method 200 may initiate a test of the overspeed protection system while the powerplant is shutting down. FIGS. 3 and 4 describe and illustrate the steps associated with testing the overspeed protection system while the powerplant is shutting down.

In step 230, the method 200 may determine that the shaft speed of the powerplant may be operating within a normal speed range.

In step 235, the method 200 may initiate a test of the overspeed protection system while the powerplant may be at FSNL. FIGS. 5 and 6 describe and illustrate the steps associated with testing the overspeed protection system while the powerplant may be operating at FSNL.

Figure 3A:
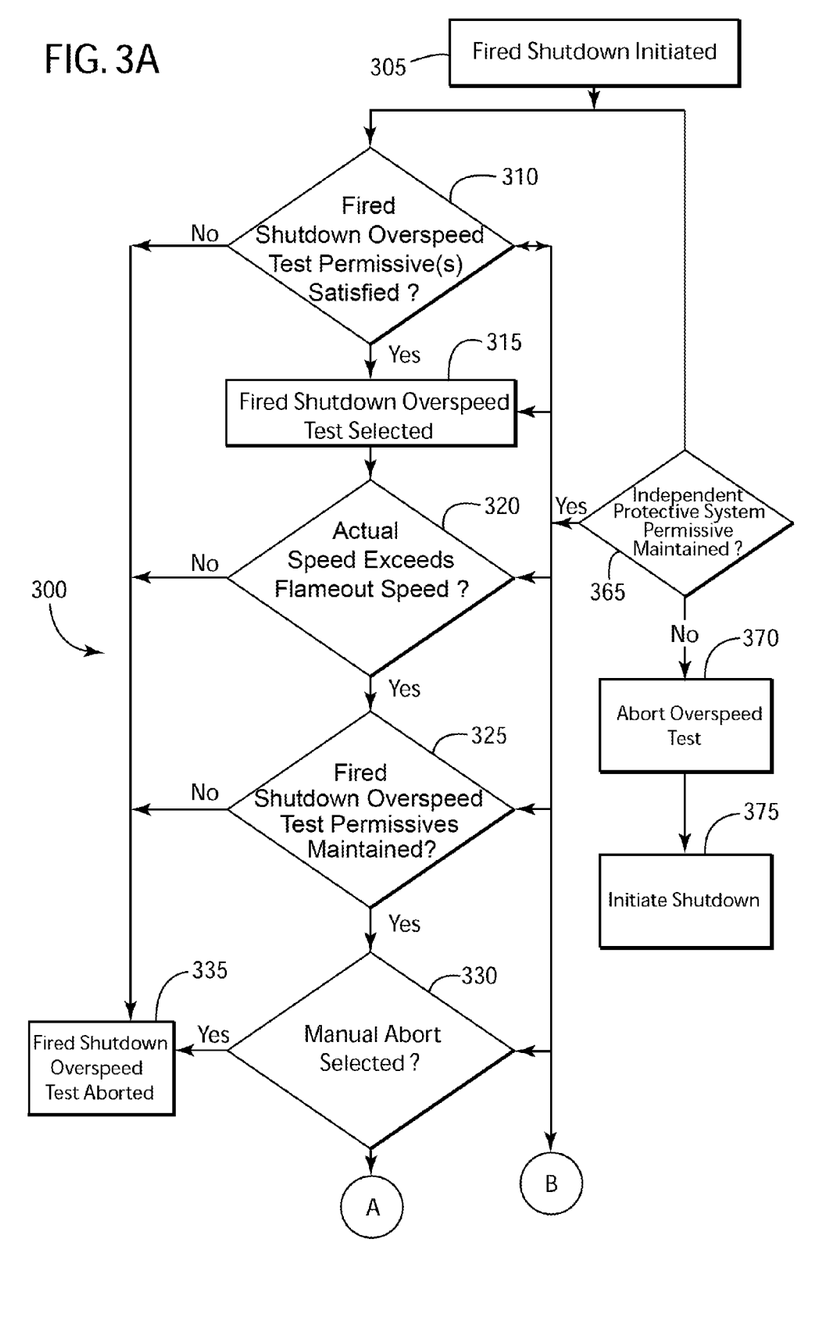
FIGS. 3A-3B (collectively FIG. 3) are flowcharts illustrating an example of a method of testing an overspeed protection system during a shutdown sequence, of FIG. 2, in accordance with an embodiment of the present invention.
Figure 3B:
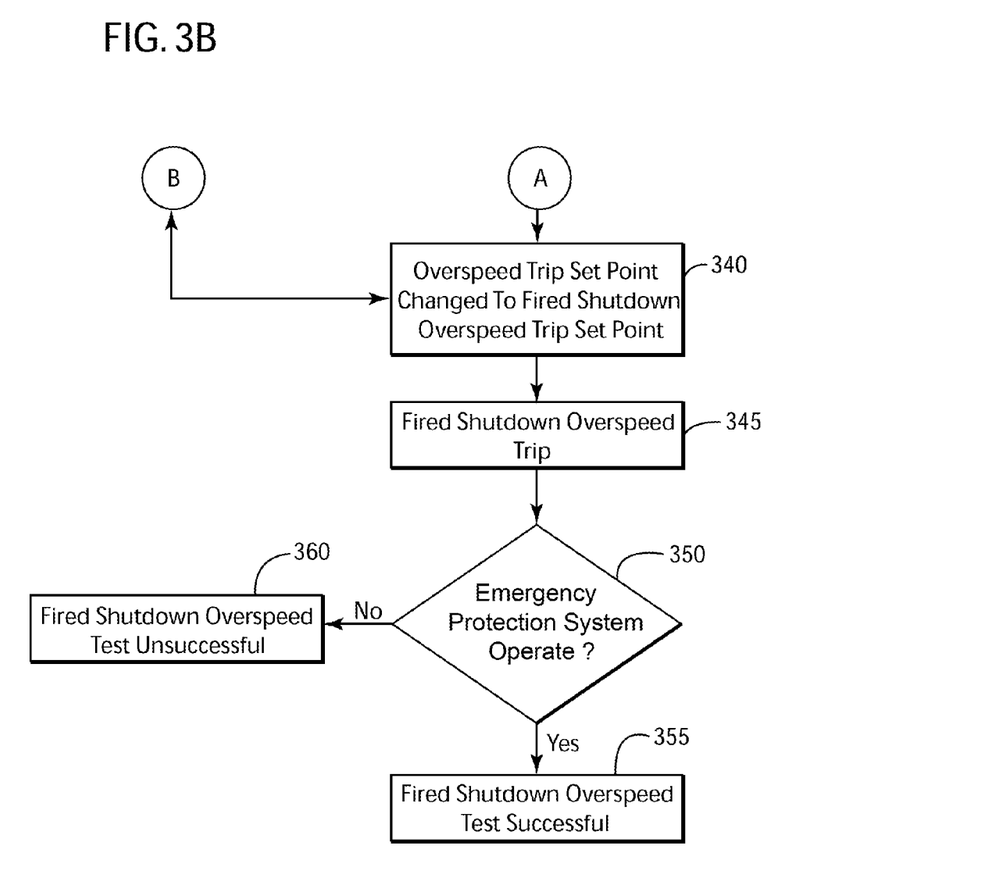

Referring now to FIGS. 3A and 3B (collectively FIG. 3), which are a flowchart illustrating a method 300 of testing an overspeed protection system during a shutdown sequence, in accordance with an embodiment of the present invention. As illustrated in FIG. 3, and described below, as the method 300 operates, the safety control system may operate in parallel and/or as an additional layer of protection.

As discussed, the safety control system 190 may serve as an independent protection system. Some embodiments of the safety control system 190 may have the configuration of a triple-modular-redundant (TMR) protection system, or the like. Some safety control systems 190 may comprise the form of a Safety Instrumented System (SIS) associated with a Safety-Integrity-Level (SIL) system, or the like.

In step 305, a fired shutdown of the gas turbine 105 is initiated. The fired shutdown may be initiated manually by an operator or automatically by a control system with requisite privileges.

In accordance with an embodiment of the present invention, the safety control system 190 may monitor the overall operating of the gas turbine 105, as the operational control system 170 implements the method 300. This is illustrated throughout FIG. 3 as steps 365-375, and is further described below.

In step 310, the method 300 determines whether at least one fired shutdown overspeed test permissive is satisfied. A user may configure a plurality of permissives that are prerequisites to testing. These permissives may be used to ensure a specific operating state prior to testing. For example, but not limiting of, a user may prefer that the gas turbine 105 is operating at or near a FSNL state prior to commencing the testing. If a required testing permissive is not satisfied, then the method 300 may proceed to step 335; otherwise the method 300 may proceed to step 315.

In step 315, the fired shutdown overspeed test is selected. A user may configure the method 300 to automatically select the test after step 310 is satisfied. A user may desire this option if the operation of the gas turbine 105 is conducted remotely. In the alternative, a user may prefer to manually select the test, which may be desirable if the operation of the turbine is conducted locally.

The method 300 may then proceed to step 320, which may determine if the actual speed of the shaft 137 exceeds the combustor flameout speed. If the actual speed exceeds the flameout speed, then the method 300 may proceed to step 325; otherwise the method 300 may proceed to step 335. The present invention allows the user to configure a parameter for determining the combustor flameout speed. For example, a user may set the combustor flameout speed as a control constant. Alternatively, the present invention allows the combustor flameout speed to be a variable automatically determined during testing.

The method 300, in step 325, determines whether the test permissive of step 310 is maintained. Operational events may cause the test permissive to change state. For example, a fuel system issue may lead to a premature flameout and loss of the test permissive. If the test permissive is not maintained, then the method 300 may proceed to step 335; otherwise the method 300 may proceed to step 330.

In step 330 the user may manually abort the test. A user may discover a reason, operationally or otherwise, for aborting the test. For example, a user may discover that a flame detector is not providing a reliable indication of flame status; and flame status may be an important testing requirement. If the user aborts the test, then the method 300 may proceed to step 335; otherwise the method 300 may proceed to step 340.

In step 335, the method 300 aborts the test. After the test is aborted, the gas turbine 105 operation reverts to the previous fired shutdown sequence. A user may configure the method 300 to provide a notification that the testing was aborted. The notification may be an alarm of varying forms such as, but not limited to, an audio signal, a graphic, or a text message.

In step 340, illustrated in FIG. 3B, the overspeed trip set point is changed to a fired shutdown trip set point. The value of the fired shutdown trip set point may be influenced by a variety of mechanical, operational, and reliability factors. These factors may vary among powerplant machine types, combustion systems, operational conditions, fuel types, etc.

The value is typically set to near the natural flame out speed of the particular combustion system, thereby minimizing the thermal transients associated with a trip. An embodiment of the present invention allows the user to input the fired shutdown trip set point value, thereby providing an adjustment means for specific conditions. Alternatively, the present invention may be configured to automatically generate, and input a value for the fired shutdown trip set point.

After the overspeed trip set point is changed, the method 300 may proceed to step 345. Here, the gas turbine 105 may experience a fired shutdown overspeed trip. The trip may occur after the actual speed of the gas turbine 105 is near the fired shutdown overspeed set point.

The method 300, in step 350, may then determine whether the emergency protection system functioned correctly. In a combustion turbine, the emergency protection system generally operates to rapidly stop the fuel flow to the combustion system, thereby extinguishing combustion. Data recording means are typically used to verify that the components of the emergency protection system operated correctly. If the emergency protection system functioned correctly, then the method 300 may proceed to step 360, where the fired shutdown test is successful; otherwise the method 300 may proceed to step 355, where the fired shutdown test is unsuccessful. The present invention may be integrated with an alarm system that notifies the user whether or not the emergency protection system functioned correctly.

Steps 365-375 represent the steps that an embodiment of the safety control system 190 may implement as the overspeed protection system is tested via steps 310-355. In step 365, the method 300 may determine whether a permissive associated with the safety control system 190 is maintained. In an embodiment of the safety control system 190, the permissive may be considered a signal, or the like that indicates that the safety control system 190 has not detected a safety issue; which requires a shutdown of the powerplant machine. As illustrated throughout FIG. 3, as the overspeed protection system is tested, the safety control system 190 may continuously monitor the gas turbine 105. If the permissive is maintained, then the method 300 may allow the testing to proceed to the next step. If the permissive is not maintained, then the method 300 may proceed to step 370.

In step 370, the method 300 may abort the overspeed test due to the loss of the permissive associated with the safety control system 190.

In step 375, the method 300 may initiate a shutdown of the gas turbine 105. In an embodiment of the present invention, the safety control system 190 may determine whether a normal shutdown, or a trip, is required, based upon the circumstance responsible for the loss of the permissive.

Figure 4A:
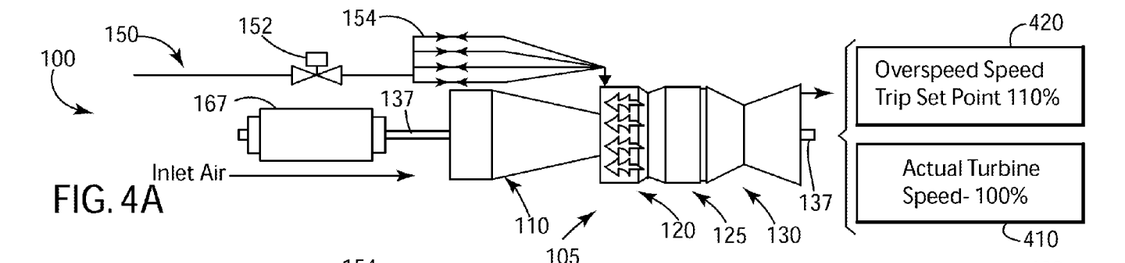
FIGS. 4A-4C (collectively FIG. 4) are schematics illustrating the methods of FIGS. 2 and 3, in use, in accordance with an embodiment of the present invention.
Figure 4B:
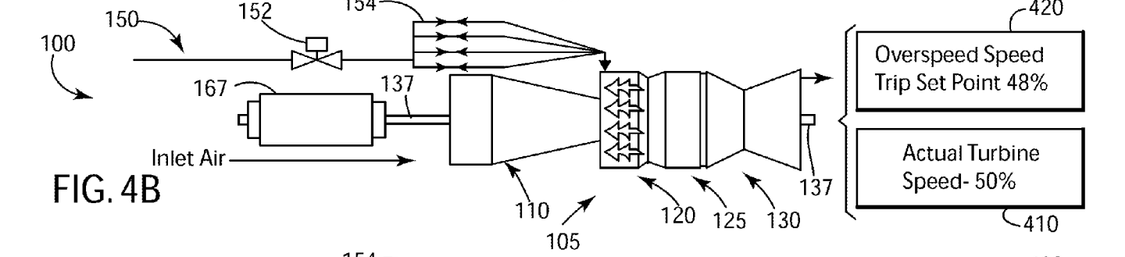
Figure 4C:
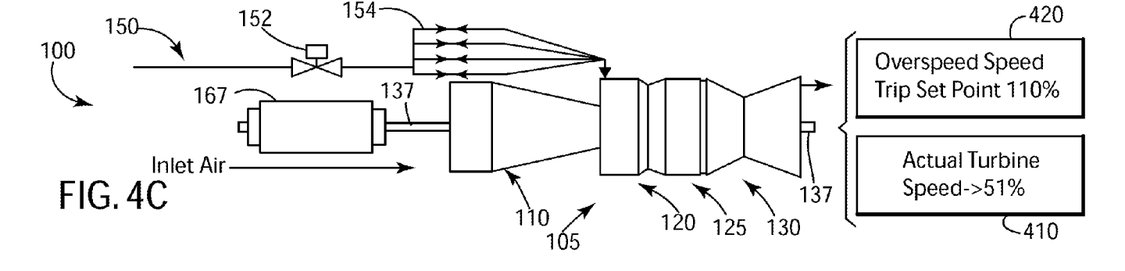

FIGS. 4A-4C (collectively FIG. 4) are schematics illustrating the methods of FIGS. 2 and 3, in use, in accordance with an embodiment of the present invention. For simplicity, FIG. 4 primarily illustrates the gas turbine 105 of the powerplant 100 illustrated in FIG. 1. FIG. 4 also illustrates pertinent operational parameters of the gas turbine 105. These parameters include actual turbine speed 410 (as a percentage of normal operating speed); overspeed trip set point (as a percentage of normal operating speed) 420; and flame detectors of the combustion system 120. FIG. 4 also illustrates the gas fuel system 150 with a stop/speed ratio valve 152, and a plurality of gas control valves 154.

Referring specifically to FIG. 4A, which illustrates that the actual turbine speed 410 is 100%, the overspeed trip set point 420 is 110%, and the flame detector indicating flame. These parameters suggest that the turbine 100 is operating in a FSNL condition.

After a fired shutdown is initiated and the test permissive (s) is satisfied, the user may commence the fired shutdown overspeed testing. FIG. 4B illustrates the gas turbine 105 experiencing a fired shutdown with the actual turbine speed 410 at 50% and flame detector indicating flame. The present invention allows the user to manually abort the test, thereby resuming the fired shutdown on the gas turbine 105.

The fired shutdown overspeed test automatically adjusts the overspeed trip set point 420 to a value near the flameout speed of the turbine 100. Here, the set point 420 is lowered to 48%.

Soon after the set point 420 is changed, the overspeed protection system should trip the gas turbine 105, as illustrated in FIG. 4C. The trip of the gas turbine 105 rapidly stops the gas fuel flow to the gas turbine 105, thereby extinguishing the flame. FIG. 4C illustrates that the flame detector, of the combustion system, 120 does not indicate a flame presence. After the gas turbine 105 trips, the overspeed trip set point 420 may automatically reset to a default value.

Figure 5A:
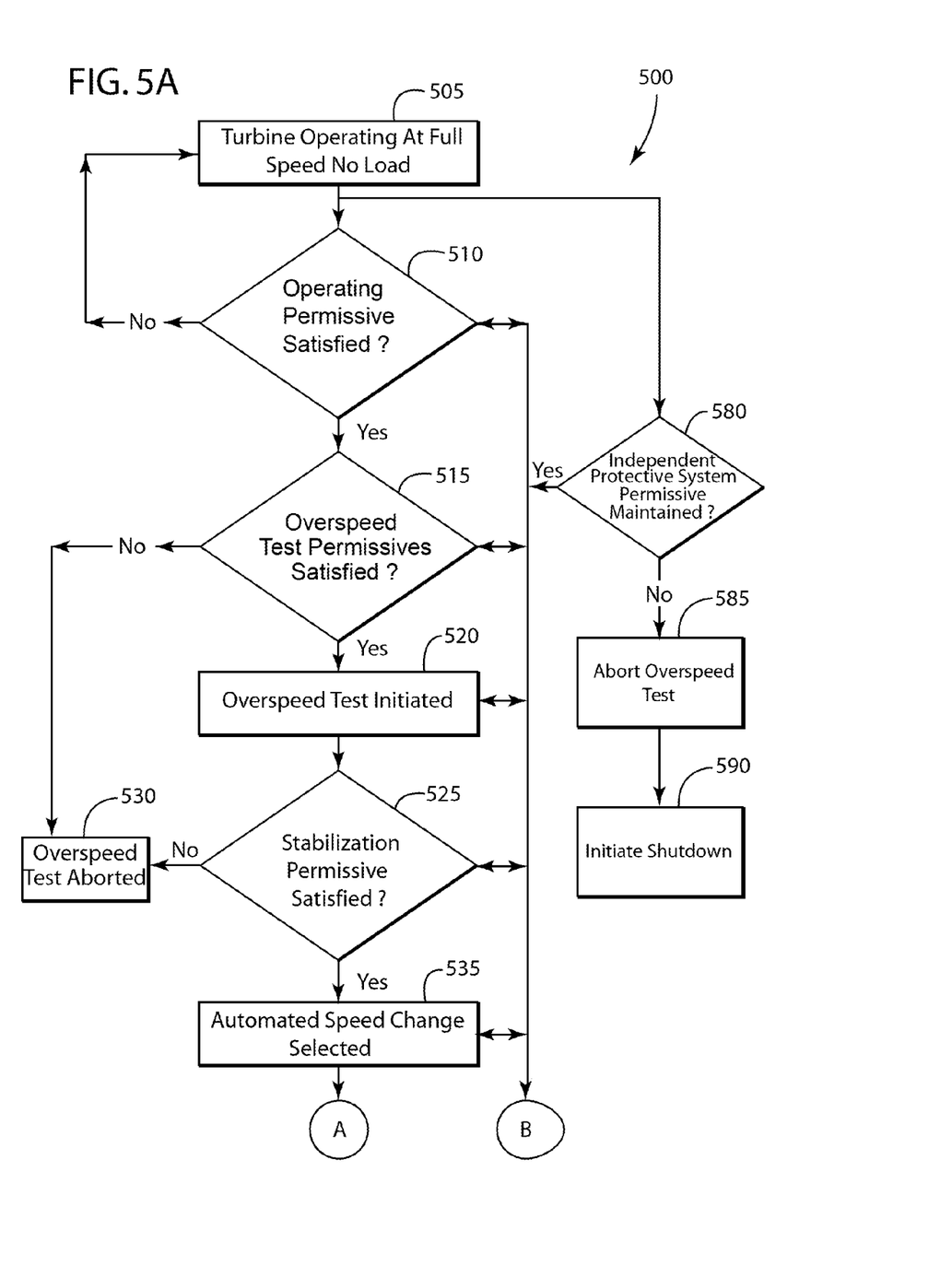
FIGS. 5A and 5B (collectively FIG. 5) are flowcharts illustrating an example of a second method of testing an overspeed protection system, of FIG. 2, in accordance with an embodiment of the present invention.
Figure 5B:
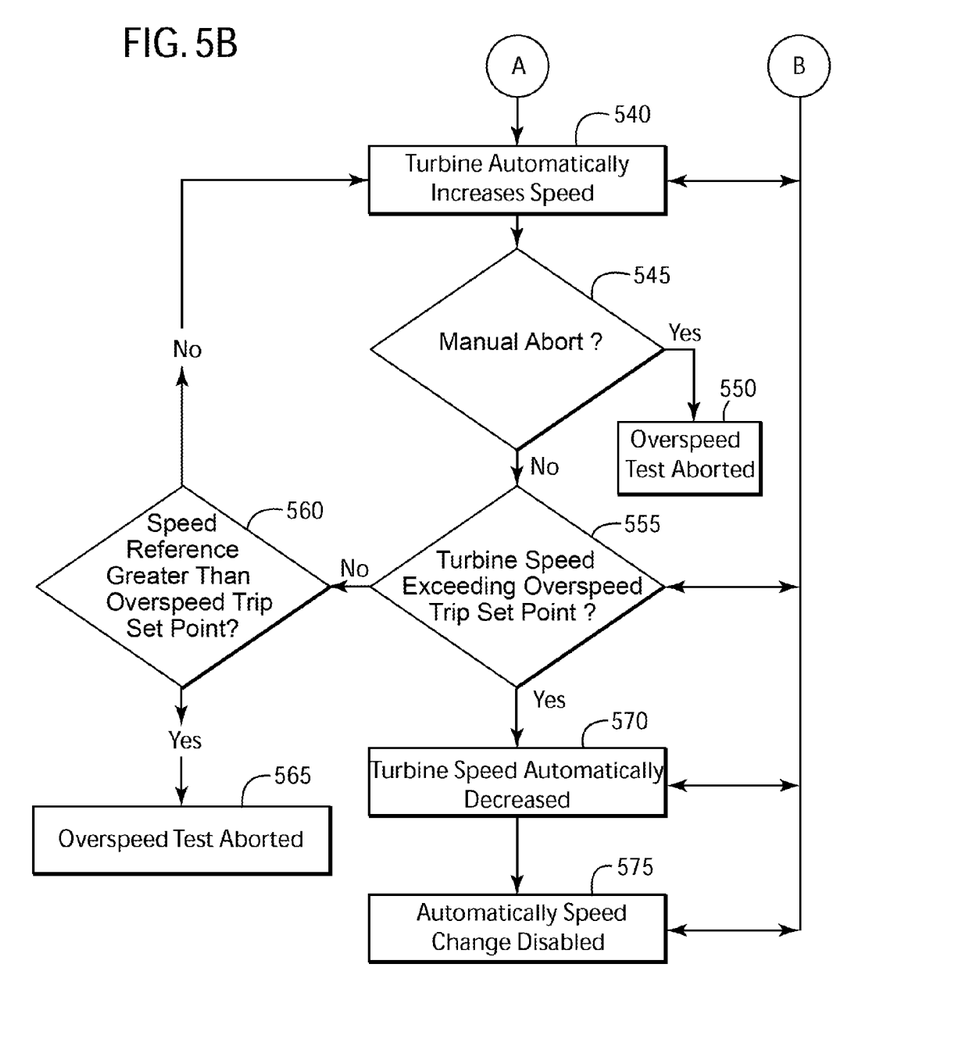

Referring now to FIGS. 5A and 5B (collectively FIG. 5), which are a flowchart illustrating the steps for a method 500 of testing an overspeed protection system of a turbine while the gas turbine 105 initially operates at FSNL. As illustrated in FIG. 5, and described below, as the method 500 operates, the safety control system 190 may operate in parallel and/or as an additional layer of protection.

In an embodiment of the present invention, an operator may use the operational control system 170 to monitor and/or control the operation of the method 500, via a graphical user interface (GUI) or the like.

The method 500 may include a biasing system or the like which adjusts the default set points of the overspeed protection system trip and an emergency protection system trip. The biasing system may allow the speed of the gas turbine 105 to increase to the default setting of the overspeed trip set point, without tripping the gas turbine 105. This may ensure that the overspeed protection system is tested at the default setting of the overspeed trip set point. Furthermore, an embodiment of the method 500 may not disable the overspeed protection system or the emergency protection system. For example, but not limiting of, during testing, the biasing system may increase the emergency trip set point from 110% to 111% and the protection trip set point from 113% to 114%. Therefore, if the present invention were to malfunction, independent lines of protection may protect the gas turbine 105.

The present invention may require that at least one test permissive is satisfied and maintained prior to the start of the overspeed test. These permissives may include a master protective trip state; a generator/driven load status; an operating permissive; an inlet guide vane position; and a stabilization permissive. Furthermore, each permissive may be required at a different period of the overspeed test. For example, an operating permissive may be required before the testing starts, whereas the stabilization permissive may be required during the testing.

In step 505, a gas turbine 105 may be operating at FSNL, which may be a preferable starting condition for an overspeed test. Typically, a gas turbine 105 operates at FSNL when not exporting energy to an external load. For example, before synchronizing the generator 167 to a utility grid, a gas turbine 105 operates at FSNL.

In accordance with an embodiment of the present invention, the safety control system 190 may monitor the overall operating of the gas turbine 105, as the operational control system 170 implements the method 500. This is illustrated throughout FIG. 5 as steps 580-590 and is further described below.

In step 510, the method 500 determines if an operating permissive is satisfied. An embodiment of the present invention may allow the user to configure at least one operating permissive. The operating permissive may include continuous operation at FSNL, a soak time, or the like requirement. For example, the permissive may require a longer operation period for a new shaft. If the operating permissive is satisfied, then the method 500 may proceed to step 515; otherwise the method 500 may revert to step 505.

In step 515, the method 500 determines whether at least one overspeed test permissive is satisfied. Similar to step 510, an embodiment of the present invention may allow the user to define the overspeed test permissive or define a plurality of overspeed test permissives. For example, but not limiting of, the overspeed test permissive may include: an inlet guide vane position; a compressor protection system status; and an inlet air system status, inlet bleed heat, or the like. If the overspeed test permissive is not satisfied, then the method 500 may proceed to step 530; otherwise the method 500 may proceed to step 520.

In step 530, the method 500 may automatically abort the overspeed test. After the test is aborted, the gas turbine 105 operation automatically reverts to FSNL. A user may configure the method 500 to provide a notification that the test was aborted. The notification may be an alarm of varying forms such as, but not limited to, an audio signal, a graphic, or a text message.

The method 500 may proceed to step 520, where the overspeed test is initiated. A user may pre-configure the method 500 to automatically initiate the overspeed test after step 515 is satisfied. A user may desire this option if, for example, the operation of the gas turbine 105 is conducted remotely. Alternatively, the method 500 may be pre-configured to require a user action to initiate the overspeed test. The user action may be, but is not limited to, selecting an "overspeed test initiate" button, or the like, on a display where the turbine is locally controlled.

In step 525, the method 500 may determine whether a stabilization permissive is satisfied. The stabilization permissive may ensure that the gas turbine 105 is operating near a thermal steady state with minimal heat transients. The stabilization permissive may be in the form of a timer, or the like, which counts the gas turbine 105 operating time. Similar to steps 510 and 515, an embodiment of the present invention may allow the user to define a stabilization permissive or a plurality of stabilization permissives. Furthermore, the stabilization permissive may vary among types and/or classes of gas turbine 105. If the stabilization test permissive is not satisfied, then the method 500 may proceed to step 530; otherwise the method 500 may proceed to step 535.

In step 535, the method 500 may select an automatic speed increase. An embodiment of the present invention may notify the user that the method 500 is ready for an automatic speed increase. This notification may be, but is not limited to, an alarm and/or a prompt requiring a user action to proceed with the automatic speed increase. Alternatively, an embodiment of the present invention may be pre-configured to automatically select the automatic speed increase.

In step 540, the method 500 may automatically increase the speed of the shaft of the gas turbine 105. An embodiment of the present invention may vary the rate at which the speed increases, thereby allowing a user to minimize the thermal transients commonly associated with speed increases. The rate may vary depending on turbine class and operational environment. For example, an embodiment of the present invention may also allow the user to vary the rate during the overspeed testing to account for the momentum associated with the shaft and other mechanical components. Furthermore, a relatively faster rate may be used during lower speeds and a slower rate used as the turbine nears the overspeed trip set point.

After the automatic speed increases commence, the method 500, in step 545, may determine whether the user decides to manually abort the overspeed test. A reason for aborting the overspeed test may include, but is not limited to, operational issues. For example, the higher shaft speeds may cause a vibration concern, requiring the user to abort the test. If the user aborts the overspeed test, then the method 500 may proceed to step 550; otherwise the method 500 may proceed to step 555.

In step 550, the method 500 aborts the test. Similar to step 530, after the overspeed test is aborted, the gas turbine 105 operation may revert to FSNL. A user may configure the method 500 to provide a notification that the overspeed test was aborted during step 545. The notification may be an alarm of varying forms such as, but is not limited to, an audio signal, a graphic, or a text message.

The present invention may incorporate a control system, turbine controller, or the like; that operates the turbine. The turbine controller may include at least one processing system, commonly called a core, which registers the speed of the turbine. An embodiment of the present invention may include a turbine controller having at least two cores, an operation core, and a protection core, or the like. The method 500, in step 555, allows the user to pre-configure each core to register the gas turbine 105 speed. This serves to verify that the gas turbine 105 is experiencing an overspeed condition.

The gas turbine 105 may include a protection system that generally operates to rapidly stop the fuel flow to the combustion system, thereby extinguishing combustion. Data recording means are typically used to verify that the protection system components operated correctly during the overspeed test. The present invention may be integrated with an alarm system that notifies the user whether or not the protection system would have operated correctly in the event of a real overspeed condition.

In step 555, the method 500 may determine whether the shaft speed exceeds the overspeed trip set point. In an embodiment of the present invention, if the operation core and protection core do not register that the shaft speed exceeds the overspeed trip set point, then the method 500 may proceed to step 560; otherwise the method 500 may proceed to step 570.

An embodiment of the present invention may increase the speed of the shaft by first increasing a speed reference. The speed reference is converted to a fuel stroke reference, or the like, which eventually increases the speed of the shaft. In step 560, the method 500 determines if the turbine controller is initiating a speed reference greater than the overspeed trip set point. If the speed reference is not greater than the overspeed trip set point, then the method 500 may revert to step 540. Alternatively, if the speed reference is greater than the overspeed trip set point, then the method 500 may proceed to step 565.

In step 565, the overspeed test is aborted to avoid a trip or a catastrophic failure that may be caused by a variety of reasons. One reason for a catastrophic failure involves the thermal growth rates, which vary between the rotating and stationary turbine components. Generally, as the shaft speed increases, there is an increase in the thermal expansion of the components. Moreover, relatively tight clearances exist between the rotating and stationary turbine components, which are often made of different materials. These clearances may decrease further as the rotating and stationary components grow during the overspeed testing. Hence, to avoid a catastrophic failure resulting from contact among rotating and stationary turbine components, the method 500, in step 565 may abort the overspeed speed testing if the speed reference exceeds the overspeed trip set point, even though the turbine speed is registering below the overspeed trip set point.

In step 570, the method 500 automatically decreases the shaft speed. Similar to step 540, an embodiment of the present invention may vary the rate at which the speed decreases, thereby allowing a user to minimize the thermal transients commonly associated with speed decreases. For example, but not limiting of, the rate may vary depending on turbine class and operational environment. An embodiment of the present invention may also allow the user to vary the rate of speed decrease. For example, a relatively faster rate may be used during higher shaft speeds and a slower rate used as the shaft speed nears the normal operating speed.

The overspeed test of the present invention may be considered complete when the shaft speed returns to around the normal operating speed. In step 575, the method 500 may disable the automatic speed changes after the shaft speed returns to around FSNL.

Steps 580-590 represent the steps that an embodiment of the safety control system 190 may implement as the overspeed protection system is tested via steps 505-575. In step 580, the method 500 may determine whether a permissive associated with the safety control system 190 is maintained. In an embodiment of the safety control system 190, the permissive may be considered a signal, or the like, that indicates that the safety control system 190 has not detected a safety issue; which requires a shutdown of the powerplant machine. As illustrated throughout FIG. 5, as the overspeed protection system is tested, the safety control system 190 may continuously monitor the gas turbine 105. If the permissive is maintained, then the method 500 may allow the testing to proceed to the next step. If the permissive is not maintained, then the method 500 may proceed to step 585.

In step 585, the method 500 may abort the overspeed test due to the loss of the permissive associated with the safety control system 190.

In step 590, the method 500 may initiate a shutdown of the gas turbine 105. In an embodiment of the present invention, the safety control system 190 may determine whether a normal shutdown, or a trip, is required, based upon the circumstance responsible for the loss of the permissive.

Referring now to FIGS. 6A-6E (collectively FIG. 6), which are schematics illustrating the environment in which an embodiment of the method 500 may operate. FIG. 6 illustrates the gas turbine 105 experiencing a test of the overspeed protection system, in accordance with an embodiment of the present invention. FIG. 6 also illustrates operational parameters of the gas turbine 105. These parameters include actual turbine speed 610 (as a percentage of normal operating speed); overspeed trip set point (as a percentage of normal operating speed) 620; and flame detector of the combustion system 120. FIG. 6 also illustrates a gas fuel system 150 having a stop/speed ratio valve 152, a plurality of gas control valves 154.

Figure 6A:
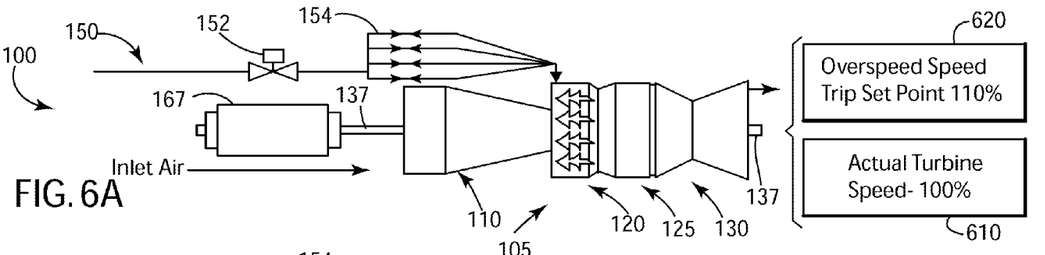
FIGS. 6A-6E (collectively FIG. 6) are schematics illustrating the methods of FIGS. 2 and 5, in use, in accordance with an embodiment of the present invention.

Referring specifically to FIG. 6A, which illustrates that the actual turbine speed 610 is 100%, the overspeed trip set point 620 is 110% and the flame detector of the combustion system 120 indicating flame. These parameters suggest that the gas turbine 105 may be operating in a FSNL condition. After the testing permissive(s) is satisfied, the user may commence the overspeed test.

Figure 6B:
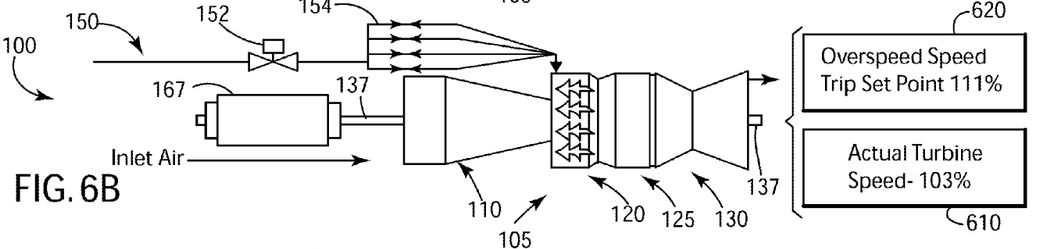

FIG. 6B illustrates that after the overspeed test has commenced the actual turbine speed 610 increased to 103% and the overspeed trip set point 620 is biased to 111%. The present invention automatically adjusts the speed of the shaft 137 during the overspeed test.

Figure 6C:
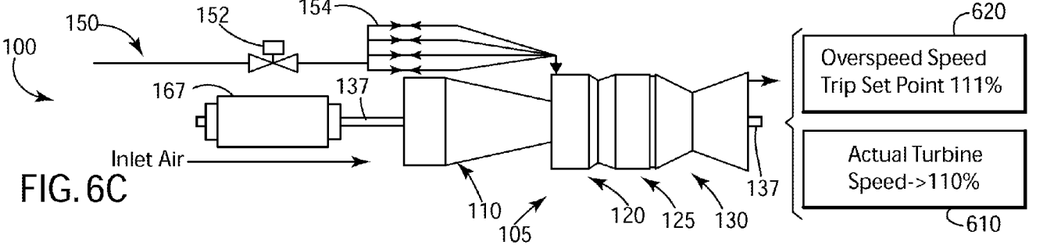
Figure 6D:
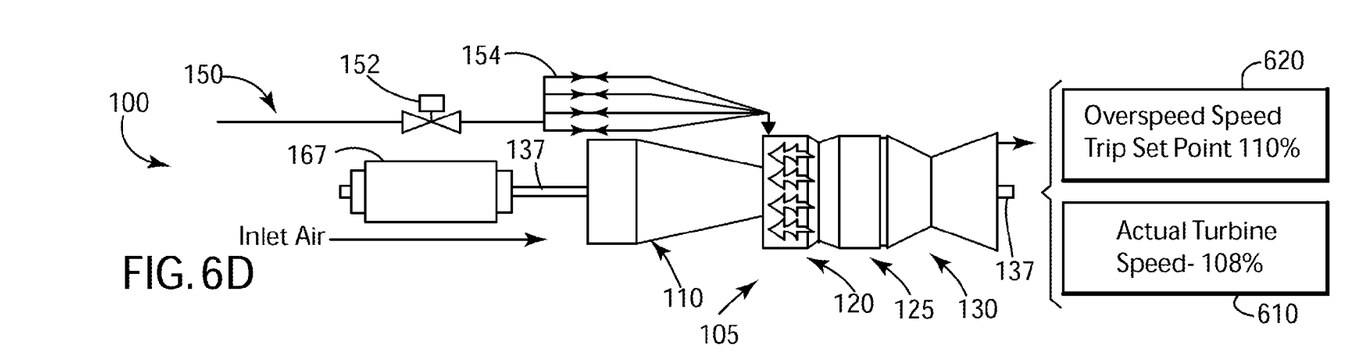
Figure 6E:
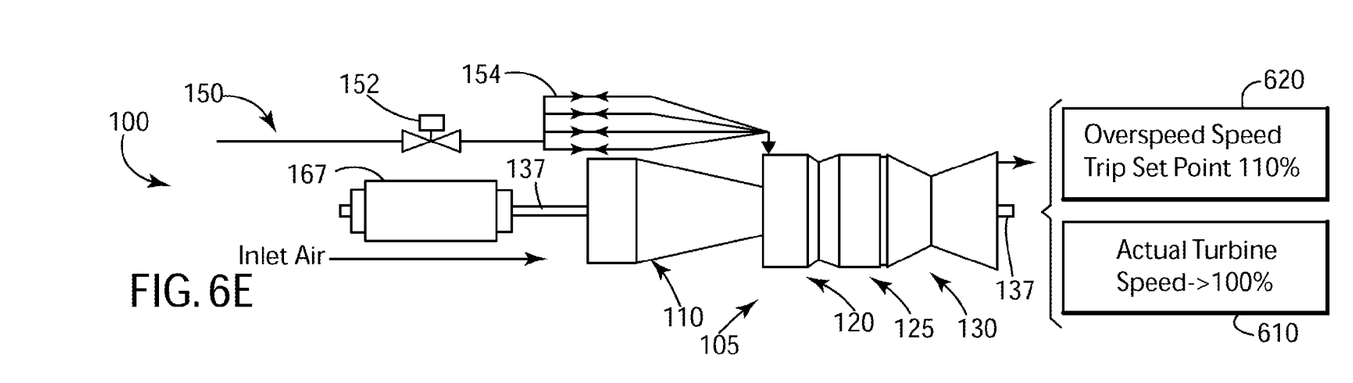

FIG. 6C illustrates the actual speed of the shaft 137 to be 110%, equal to that of the default value of the overspeed trip setting. As discussed, the overspeed trip set point 620 is biased to 111%. The present invention does not trip the gas turbine 105 during the overspeed test when an overspeed condition is reached. An embodiment of the present invention may notify the user of the overspeed condition. As illustrated in FIG. 6D, the present invention automatically decreases the speed of the shaft 137 after the overspeed condition is reached. Here, the actual speed 610 has been automatically lowered to 108%. Furthermore, the present invention may remove the biasing of the overspeed trip after actual speed reaches the default value of the overspeed trip setting. Here, the overspeed trip set point 620 is returned to the default value of 110%. As illustrated in FIG. 6E, an embodiment of the present invention may continue to automatically adjust the speed of the shaft 137 until FSNL is reached, thereby completing the test. Thereafter, a user may resume normal operation of the powerplant 100.

Figure 7:
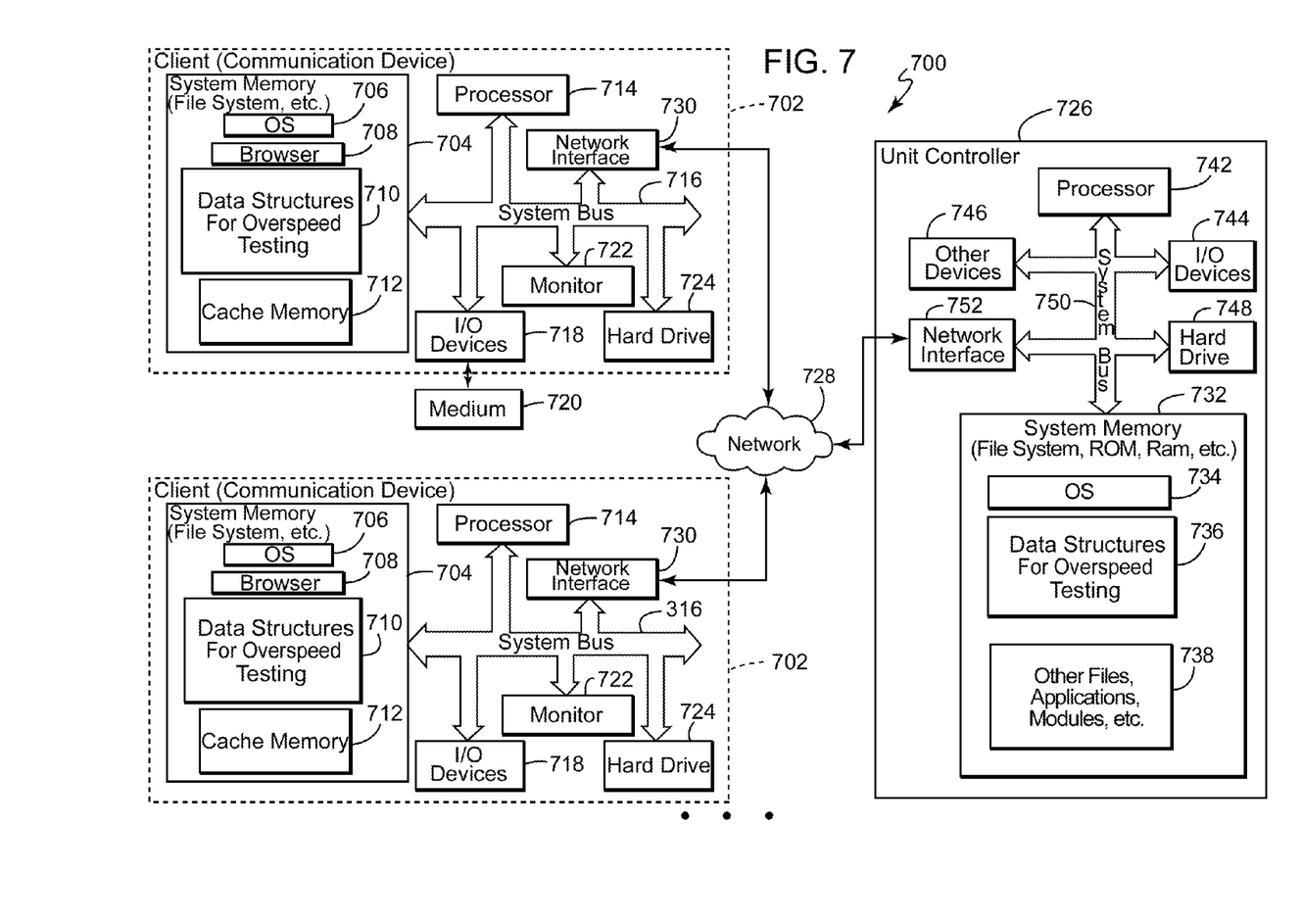
FIG. 7 is a block diagram of an exemplary system for testing an overspeed protection system in accordance with embodiments of the present invention.

FIG. 7 is a step diagram of an exemplary system 700 to automatically test the overspeed protection system of a turbomachine in accordance with embodiments of the present invention. The elements of the methods 300,500 may be embodied in and performed by the system 700. The system 700 may include one or more user or client communication devices 702 or similar systems or devices (two are illustrated in FIG. 7). Each communication device 702 may be a computer system, a personal digital assistant, a cellular phone, or similar device capable of sending and receiving an electronic message.

The communication device 702 may include a system memory 704 or local file system. The system memory 704 may include a read only memory (ROM) and a random access memory (RAM). The ROM may include a basic input/output system (BIOS). The BIOS may contain basic routines that help to transfer information between elements or components of the communication device 702. The system memory 704 may contain an operating system 706 to control overall operation of the communication device 702. The system memory 704 may also include a browser 708 or web browser. The system memory 704 may also include data structures 710 or computer-executable code to automatically test the overspeed protection system of a turbomachine that may be similar or include elements of the methods 300, 500. The system memory 704 may further include a template cache memory 712, which may be used in conjunction with the methods 300,500 to automatically store data from the most recent test.

The communication device 702 may also include a processor or processing unit 714 to control operations of the other components of the communication device 702. The operating system 706, browser 708, data structures 710 may be operable on the processor 714. The processor 714 may be coupled to the memory system 704 and other components of the communication device 702 by a system bus 716.

The communication device 702 may also include multiple input devices, output devices or combination input/output devices 718. Each input/output device 718 may be coupled to the system bus 716 by an input/output interface (not shown in FIG. 7). The input and output devices or combination I/O devices 718 permit a user to operate and interface with the communication device 702 and to control operation of the browser 708 and data structures 710 to access, operate and control the software to automatically test the overspeed protection system of a turbomachine. The I/O devices 718 may include a keyboard and computer pointing device or the like to perform the operations discussed herein.

The I/O devices 718 may also include disk drives, optical, mechanical, magnetic, or infrared input/output devices, modems or the like. The I/O devices 718 may be used to access a medium 720. The medium 720 may contain, store, communicate or transport computer-readable or computer-executable instructions or other information for use by or in connection with a system, such as the communication devices 702.

The communication device 702 may also include or be connected to other devices, such as a display or monitor 722. The monitor 722 may be used to permit the user to interface with the communication device 702. The monitor 722 present images, graphics, or the like, which may be generated by the data structures 710 for automatically testing the overspeed protection system of a turbomachine.

The communication device 702 may also include a hard disk drive 724. The hard drive 724 may be coupled to the system bus 716 by a hard drive interface (not shown in FIG. 7). The hard drive 724 may also form part of the local file system or system memory 704. Programs, software and data may be transferred and exchanged between the system memory 704 and the hard drive 724 for operation of the communication device 702.

The communication devices 702 may communicate with a remote server 726 and may access other servers or other communication devices similar to communication device 702 via a network 728. The system bus 716 may be coupled to the network 728 by a network interface 730. The network interface 730 may be a modem, Ethernet card, router, gateway or the like for coupling to the network 728. The coupling may be a wired connection or wireless. The network 728 may be the Internet, private network, an intranet or the like.

The server 726 may also include a system memory 732 that may include a file system, ROM, RAM and the like. The system memory 732 may include an operating system 734 similar to operating system 706 in communication devices 702. The system memory 732 may also include data structures 736 to automatically test the overspeed protection system of a turbomachine. The data structures 736 may include operations similar to those described with respect to the methods 300,500 for automatically testing the overspeed protection system of a turbomachine. The server system memory 732 may also include other files 738, applications, modules and the like.

The server 726 may also include a processor 742 or a processing unit to control operation of other devices in the server 726. The server 726 may also include I/O device 744. The I/O devices 744 may be similar to I/O devices 718 of communication devices 702. The server 726 may further include other devices 746, such as a monitor or the like to provide an interface along with the I/O devices 744 to the server 726. The server 726 may also include a hard disk drive 748. A system bus 750 may connect the different components of the server 726. A network interface 752 may couple the server 726 to the network 728 via the system bus 750.

The flowcharts and step diagrams in the FIGS. illustrate the architecture, functionality, and operation of possible implementations of systems, methods and computer program products according to various embodiments of the present invention. In this regard, each step in the flowchart or step diagrams may represent a module, segment, or portion of code, which comprises one or more executable instructions for implementing the specified logical function(s). It should also be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved. It will also be noted that each step of the block diagrams and/or flowchart illustration, and combinations of steps in the block diagrams and/or flowchart illustration, can be implemented by special purpose hardware-based systems which perform the specified functions or acts, or combinations of special purpose hardware and computer instructions.

As one of ordinary skill in the art will appreciate, the many varying features and configurations described above in relation to the several exemplary embodiments may be further selectively applied to form the other possible embodiments of the present invention. Those in the art will further understand that all possible iterations of the present invention are not provided or discussed in detail, even though all combinations and possible embodiments embraced by the several claims below or otherwise are intended to be part of the instant application. In addition, from the above description of several exemplary embodiments of the invention, those skilled in the art will perceive improvements, changes, and modifications. Such improvements, changes, and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

What is claimed is:

1. A method of testing an overspeed protection system of a powerplant, the method comprising:

providing a powerplant machine comprising a shaft and an operational control system, wherein the operational control system is configured for operating the powerplant machine and comprises an overspeed protection system configured for detecting an overspeed event associated with the shaft;

providing a safety control system independent of the operational control system, wherein the safety control system is configured for reducing risk associated with operating the powerplant machine; and wherein the safety control system functions as a stand-alone system independent of the operational control system;

selecting a methodology for testing the overspeed protection system; wherein the methodology determines whether the powerplant machine is operating in a shutdown mode or an operating mode;

determining whether the speed of the shaft exceeds a shutdown value representative of the overspeed event, if the powerplant machine is in the shutdown mode;

determining whether the speed of the shaft exceeds an overspeed trip value representative of the overspeed event, if the powerplant machine is in the operating mode;

changing the overspeed trip value; and determining whether the overspeed protection system would operate to trip the powerplant machine;

wherein the method reduces the possibility of a trip occurring during testing of the overspeed protection system.

2. The method of claim 1, wherein the powerplant comprises multiple powerplant machines.

3. The method of claim 2, wherein the multiple powerplant machines comprise a gas turbine and a steam turbine, and wherein the shaft integrates the gas turbine and the steam turbine forming a steam and gas powertrain (STAG).

4. The method of claim 3, wherein the methodology comprises a shutdown mode procedure configured for the shutdown mode, and an operating mode procedure configured for the operating mode.

5. The method of claim 4, wherein the shutdown mode procedure performs the steps of:
   a. determining whether a testing permissive is satisfied;
   b. initiating a fired shutdown overspeed test;
   c. aborting the fired shutdown overspeed test if the speed of the shaft does not exceed a flameout speed; and
   d. changing an overspeed trip set point to a fired shutdown trip set point.

6. The method of claim 5, wherein an emergency protection system controls a governor system associated with the gas turbine and the steam turbine, wherein the governor system partially controls a speed and an acceleration of the shaft.

7. The method of claim 6, further comprising the step of aborting the fired shutdown overspeed test if the testing permissive is not maintained.

8. The method of claim 7 further comprising the step of determining whether the emergency protection system controls the operation of the gas turbine and the steam turbine.

9. The method of claim 8, further comprising the step of aborting the testing of the overspeed protection system if an operational permissive associated with the safety control system is not maintained.

10. The method of claim 4, wherein the operating mode procedure performs the steps of:
    a. automatically adjusting the speed of the shaft to approximately the overspeed trip value;
    b. determining if the speed of the shaft is approximately the overspeed trip value; and
    c. automatically adjusting the speed of the shaft to approximately an operating speed after determining if the speed of the shaft is approximately the overspeed trip value.

11. The method of claim 10, further comprising the steps of:
    a. initiating an overspeed test;
    b. determining whether a stabilization permissive is satisfied, otherwise aborting the overspeed test if the stabilization permissive is not satisfied;
    c. automatically adjusting the speed of the shaft;
    d. determining whether the speed of the shaft exceeds an overspeed trip value;
    e. determining whether a shaft speed reference exceeds the overspeed trip value;
    f. aborting the overspeed test if the shaft speed reference exceeds the overspeed trip value while the speed of the shaft is below the overspeed trip value; and
    g. automatically disabling the automatic adjustment of the speed of the shaft.

12. The method of claim 11, wherein the step of aborting the overspeed test adjusts the speed of the shaft to approximately an operating speed.

13. The method of claim 12 further comprising determining whether an operating permissive is satisfied.

14. The method of claim 13 further comprising determining whether an overspeed test permissive is satisfied.

15. The method of claim 14 further comprising biasing an overspeed trip set point.

16. A method of testing an overspeed protection system of a powerplant, the method comprising:
    providing a powerplant comprising a gas turbine and a steam turbine, and wherein a shaft integrates the gas turbine and the steam turbine forming a steam and gas powertrain (STAG);
    providing an operational control system, wherein the operational control system is configured for operating the powerplant machine and comprises an overspeed protection system configured for detecting an overspeed event associated with the shaft;
    providing a safety control system independent of the operational control system, wherein the safety control system is configured for reducing risk associated with operating the powerplant machine; and wherein the safety control system functions as a stand-alone system independent of the operational control system;
    selecting a methodology for testing the overspeed protection system; wherein the methodology determines whether the STAG is operating in a shutdown mode or an operating mode;
    determining whether the speed of the shaft exceeds a shutdown value representative of the overspeed event, if the STAG is in the shutdown mode;
    determining whether the speed of the shaft exceeds an overspeed trip value representative of the overspeed event, if the STAG is in the operating mode;
    changing the overspeed trip value; and
    determining whether the overspeed protection system would operate to trip the STAG;
    wherein the method reduces the possibility of a STAG trip during testing of the overspeed protection system.

17. The method of claim 16, wherein the methodology comprises a shutdown mode procedure configured for the shutdown mode, and an operating mode procedure configured for the operating mode.

18. The method of claim 17, wherein the shutdown mode procedure performs the steps of:
    a. determining whether a testing permissive is satisfied;
    b. initiating a fired shutdown overspeed test;
    c. aborting the fired shutdown overspeed test if the speed of the shaft does not exceed a flameout speed; and
    d. changing an overspeed trip set point to a fired shutdown trip set point.

19. The method of claim 17, wherein the operating mode procedure performs the steps of:
    a. automatically adjusting the speed of the shaft to approximately the overspeed trip value;
    b. determining if the speed of the shaft is approximately the overspeed trip value;
    c. automatically adjusting the speed of the shaft to approximately an operating speed after determining if the speed of the shaft is approximately the overspeed trip value;
    d. initiating an overspeed test;
    e. determining whether a stabilization permissive is satisfied, otherwise aborting the overspeed test if the stabilization permissive is not satisfied;
    f. automatically adjusting the speed of the shaft;
    g. determining whether the speed of the shaft exceeds an overspeed trip value;
    h. determining whether a shaft speed reference exceeds the overspeed trip value;
    i. aborting the overspeed test if the shaft speed reference exceeds the overspeed trip value while the speed of the shaft is below the overspeed trip value; and
    j. automatically disabling the automatic adjustment of the speed of the shaft.

20. The method of claim 16, further comprising the step of aborting the testing of the overspeed protection system if an operational permissive associated with the safety control system is not maintained.

* * * * *